United States Patent [19]

Iinuma et al.

[11] Patent Number: 4,644,419
[45] Date of Patent: Feb. 17, 1987

[54] FLOPPY DISK UNIT

[75] Inventors: Hiroshi Iinuma, Yokohama; Shuichi Sakaguchi, Yamato; Takashi Suzuki, Yokohama, all of Japan

[73] Assignees: Panafacom Limited; Matsushita Electric Industrial Co., Ltd., both of Kodoma, Japan

[21] Appl. No.: 860,681

[22] Filed: Apr. 30, 1986

Related U.S. Application Data

[63] Continuation of Ser. No. 605,374, Apr. 27, 1984, abandoned.

[30] Foreign Application Priority Data

May 10, 1983 [JP] Japan .................................. 58-81340

[51] Int. Cl.⁴ .................................................. G11B 5/09
[52] U.S. Cl. .......................................... 360/46; 360/51
[58] Field of Search ...................................... 360/46, 51

[56] References Cited

U.S. PATENT DOCUMENTS

| | | | |
|---|---|---|---|
| 3,465,321 | 9/1969 | Reisfeld | 360/65 |
| 4,314,289 | 2/1982 | Haynes | 360/65 |
| 4,371,901 | 2/1983 | Shah | 360/65 |
| 4,392,164 | 7/1983 | Lequien | 360/65 |
| 4,479,152 | 10/1984 | Chi | 360/65 |

*Primary Examiner*—Vincent P. Canney
*Attorney, Agent, or Firm*—Staas & Halsey

[57] ABSTRACT

A floppy disk unit has a motor drive mechanism and a data read/write circuit, a control means which changes the speed of rotation of motor and the electrical characteristics of the read/write circuit in accordance with the characteristic of the disk used and thereby the disks to be used with different speeds of rotation can be used in the same floppy disk unit.

10 Claims, 4 Drawing Figures

FLOPPY DISK UNIT

This is a continuation of co-pending application Ser. No. 605,374 filed on Apr. 27, 1984 now abandoned.

BACKGROUND OF THE INVENTION

This invention relates to a floppy disk unit which is capable of using, by the same unit, various kinds of disk mediums that are used by the units with different speed of rotation of the spindles.

The conventional speeds of rotation of the spindle of the conventional 5¼" floppy disk unit and 8" floppy disk unit are 300 rpm respectively, and 360 rpm, but recent technical progress has made it possible to bring the speed of rotation of the spindle of a 5¼" floppy disk unit to 360 rpm, and thereby the 5¼" floppy disk unit is now used with the same specifications as that of the 8" floppy disk unit. In this case, the disk mediums which have been used by the conventional 5¼" floppy disk unit of 300 rpm can no longer be used by the 5¼" floppy disk unit of 360 rpm and thereby implantation of software cannot be realized easily.

For example, a disk medium 1 may have a data transfer speed of 4 μs/bit at a speed of rotation of 300 rpm, while a disk medium 2 has a data transfer speed of 2 μs/bit at a speed of rotation of 360 rpm. Usually, each of the disk medium 1 and the disk medium 2 can be read or written only with a respective exclusive drive unit. On the other hand, a floppy disk controller side can cope with any disk medium, in case the disk mediums 1, 2 are used in the respective exclusive drive units, simply by dividing the fundamental clock frequency for reading and writing by into ½, because the data transfer speed is simply given as the ratio of 1:2.

However, in case the disk medium 1 is used with the exclusive driver for the disk medium 2, the data transfer speed becomes 3.33 μs/bit and therefore division of the fundamental clock frequency of the floppy disk controller alone cannot make it possible to read and write the data.

SUMMARY OF THE INVENTION

It is an object of this invention to easily realize implantation of software simply by using the disk mediums to be used with different speed of rotation in the same floppy disk unit. In order to attain such an object, this invention discloses a floppy disk unit comprising at least a motor driving mechanism and a data read/write circuit, wherein means is provided for changing the speed of rotation of the motor and the electrical characteristics of read/write circuit in accordance with the characteristic of the disk medium to be used.

DESCRIPTION OF THE PREFERRED EMBODIMENTS

Figure 1:
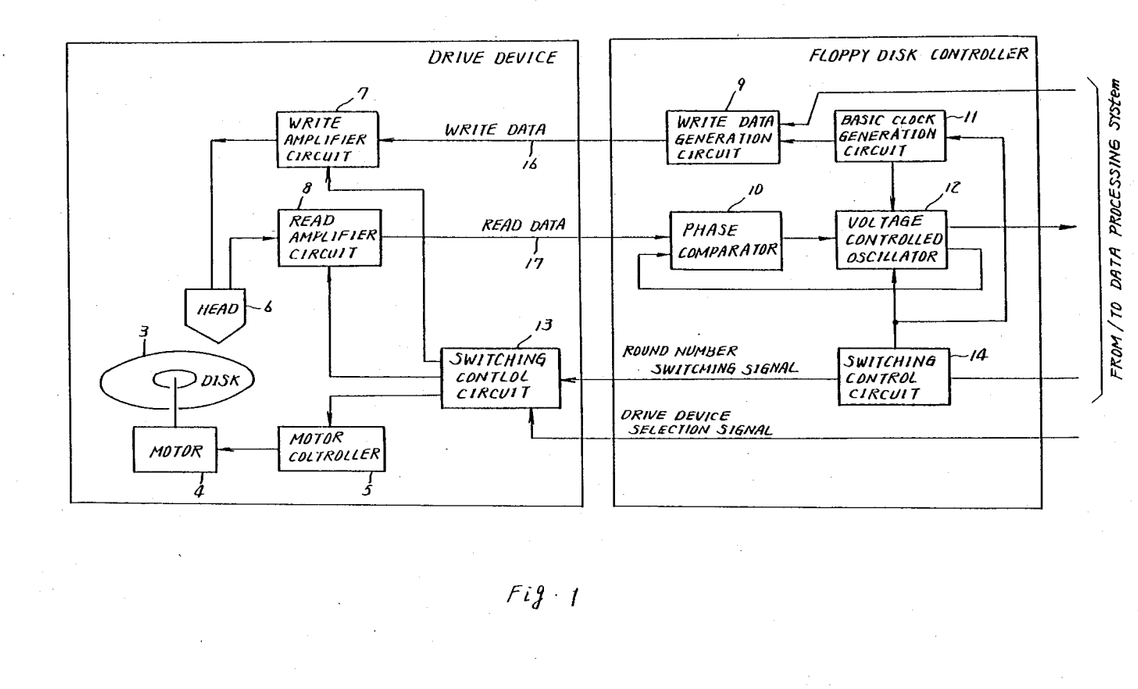
FIG. 1 is a block diagram of the principal portion of a floppy disk unit of an embodiment of this invention.

First, the operation of a floppy disk unit as shown in FIG. 1 is explained. In FIG. 1, 1 is a drive device, 2 is a floppy disk controller, 3 is a disk, 4 is a motor, 5 is a motor controller, 6 is a head, 7 is a write amplifier circuit, 8 is a read amplifier circuit, 9 is a write data generation circuit, 10 is a phase comparator, 11 is a basic clock generation circuit, 12 is a voltage controlled oscillator, 13 and 14 are switching control circuits, 15 is a speed of rotation switching signal line, 16 is a write data line, and 17 is a read data line, 18 is a drive device selection signal line.

In the embodiment indicated, the switching control circuits 13, 14 operate in accordance with an externally supplied speed of rotation data. The switching control circuit 13 switches the speed of rotation of the motor, a write current of the write amplifier circuit and a sense characteristic of the read amplifier circuit by controlling the motor controller 5, the write amplifier circuit 7, and the read amplifier circuit 8, while the switching control circuit 14 switches the basic clock frequency and the phase-lock loop characteristic by controlling the basic clock generation circuit 11 and the voltage controlled oscillator 12.

The disks 3 to be used with the driver device 1 include those which may have the same external dimensions but which are different in electrical characteristics. The drive device 1 cannot identify the disk by itself.

Therefore, the floppy disk controller 2 sets the rotation data to a high speed rotation mode and reads data from the disk. If data cannot be read normally, the floppy disk controller 2 sets the rotation data to a low speed rotation mode and again tries data reading.

The drive device 1 switches the characteristics of the motor controller 5, write amplifier circuit 7 and read amplifier circuit 8, while the floppy disk controller 2 switches the characteristics of the basic clock generation circuit and voltage controlled oscillator 12.

If failure of a previously read operation is based on a mismatching with the disk, the characteristics of the respective circuits are compensated by the above switching operation, so that the characteristics just match those of the pertinent disk, and thereby read operations are executed normally.

Figure 2:
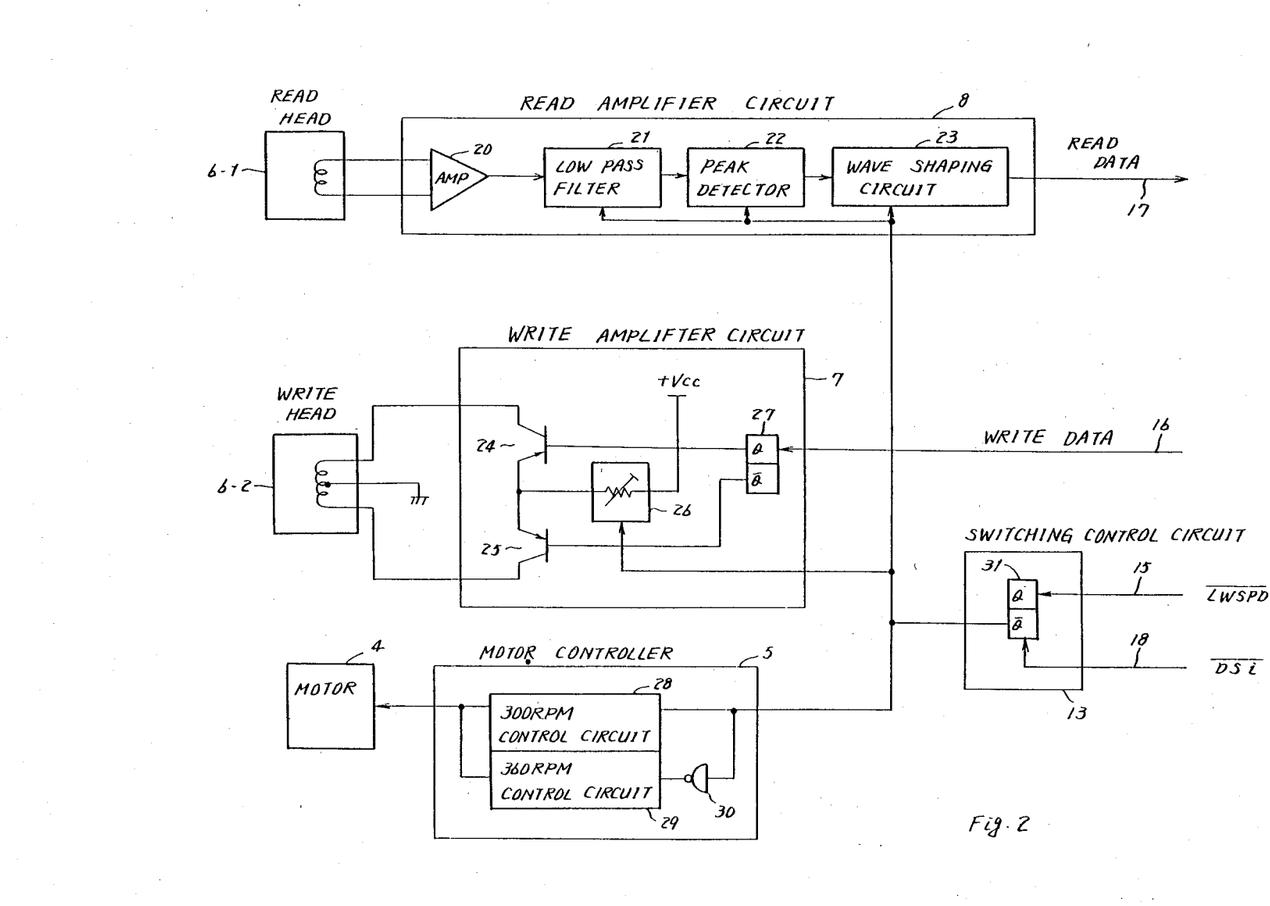
FIG. 2 is a detailed block diagram of a driver used in the floppy disk unit of the embodiment.

The operations of a drive device as shown in FIG. 2 are now described. In this figure, the same circuits as those of FIG. 1 are given the same numbers. 6-1 is a read head, 6-2 is a write head, 20 is a sense amplifier circuit, 21 is a low-pass-filter, 22 is a peak detector, 23 is a wave shaping circuit, 24 and 25 are transistors, 26 is a variable resistor circuit, 27 is a flip-flop, 28 is a 300 rpm control circuit, 29 is a 360 rpm control circuit, 30 is an invertor, 31 is a flip-flop, $\overline{\text{LWSPD}}$ is a rotation switching signal and $\overline{\text{DSi}}$ is a drive device selection signal.

In the read operations, a signal extracted from the read head 6-1 is detected by the sense amplifier circuit 20 and thereafter it becomes the read data after passing the low-pass-filter 21, peak detector 22 and wave shaping circuit 23. Such read data is then sent to the side of the floppy controller through the read data line 17.

In the write operations, a write data sent from the side of the floppy disk controller through the write data line 16 is set in the flip flop 27. The Q output and $\overline{Q}$ output of flip-flop 27 are respectively connected to the transistors 24 and 25. Thereby, one of the transistors 24 and 25 is turned ON and a write current is given to the write head 6-2.

The motor 4 is controlled by either the 300 rpm control circuit 28 or the 360 rpm control circuit 29 in the controller 5 and operates at a respective speed of rotation of either 300 rpm or 360 rpm.

The set operation of flip-flop 31 in the switching control circuit 13 is controlled by the rotation switching signal $\overline{\text{LWSPD}}$ and drive device selection signal $\overline{\text{DSi}}$.

When data indicating low speed rotation is given to the floppy disk unit from an external device, the signal $\overline{\text{LWSPD}}$ is set to the "L" level. When data indicating selection of a pertinent drive device is given to the floppy disk unit from an external device, the signal $\overline{\text{DSi}}$ is changed to "L" from "H" level. The flip-flop 31 sets $\overline{\text{LWSPD}}$ with the rising edge of the signal $\overline{\text{DSi}}$. Thereby, the $\overline{Q}$ output of flip-flop 31 becomes "H" level and sets the internal circuit constants of the low-pass-filter 21, peak detector 22 and wave shaping circuit 33 within the read amplifier circuit 8 to those for 300 rpm.

Moreover, the $\overline{Q}$ output of flip-flop 31 controls the variable resistance circuit 26 in the write amplifier circuit 7 and sets a resistance value thereof so that a write current for 300 rpm is generated.

The $\overline{Q}$ output of flip-flop 31 activates the 300 rpm control circuit 28 in the motor controller 5 and causes the motor 4 to rotate at 300 rpm.

Next, for example, when a high speed rotation signal is given to the floppy disk unit from an external device, the signal $\overline{\text{LWSPD}}$ becomes "H" level. Moreover, when the pertinent drive device selection data is given and the signal $\overline{\text{DSi}}$ changes to "L" from "H" level, the flip-flop 31 stores the signal $\overline{\text{LWSPD}}$ which is "H" level. Thereby, the control operation which is reverse to the abovementioned low speed rotation control operation is executed. Namely, the internal circuit constants of the low-pass-filter 21, peak detector 22 in the read amplifier circuit 8 and wave shaping circuit 23 are set to those for 360 rpm, and a resistance value of the variable resistance circuit 26 in the write amplifier circuit 7 is preset so that a write current for 360 rpm operation is generated. Moreover, the 360 rpm control circuit 29 is activated within the motor controller 5 and thereby the motor 4 is rotated at 360 rpm.

Figure 3:
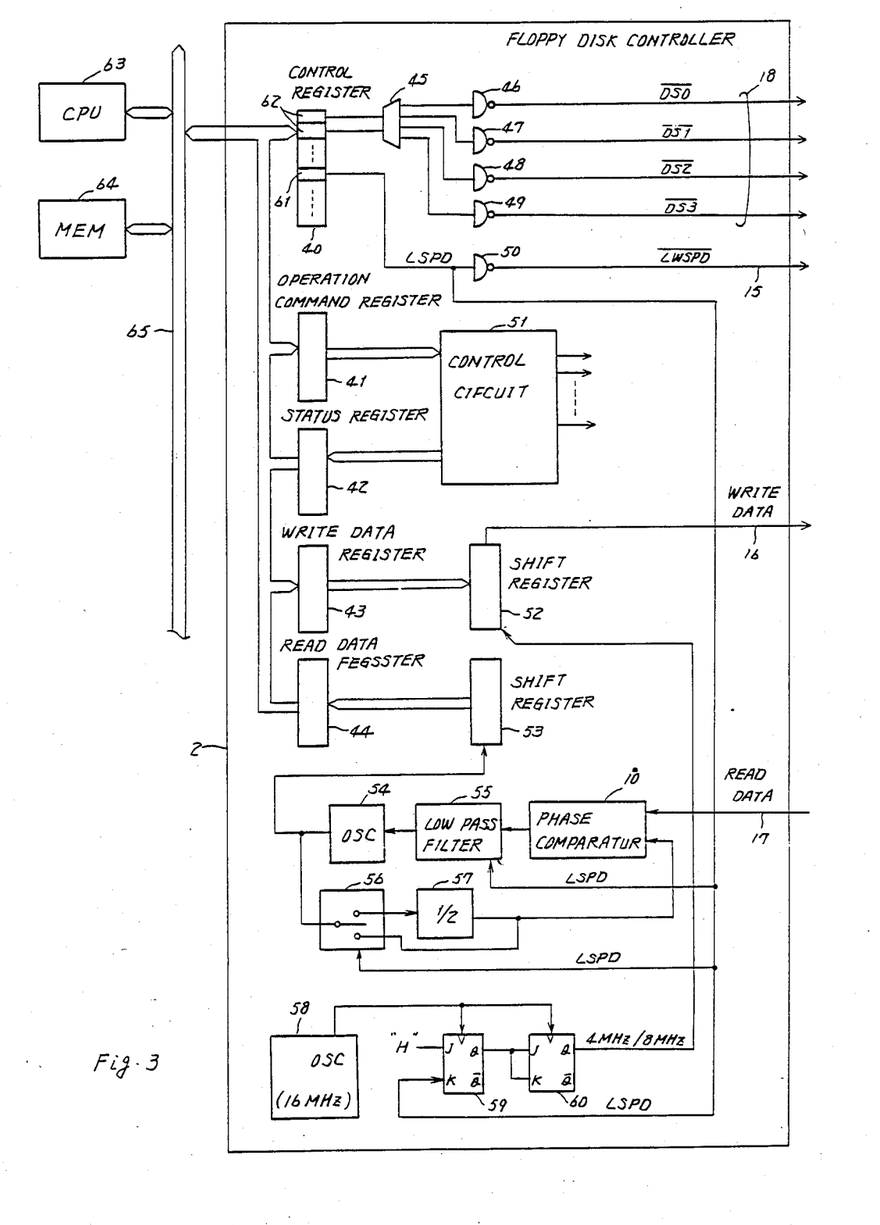
FIG. 3 is a detailed block diagram of the floppy disk controller used in the floppy disk unit of the embodiment.

Next, the operations of the floppy disk controller shown in FIG. 3 are described. In the figure, the circuits given the numbers 2, 10, 15, 16, 17 and 18 are the same circuits as those given the same numbering in FIG. 1. and FIG. 2. Further, 40 is control register, 41 is an operation command register, 42 is a status register, 43 is a write data register, 44 is a read data register, 45 is a decoder, 46 to 50 are inverters, 51 is a control circuit, 52 and 53 are shift registers, 54 is an oscillator, 55 is a low-pass-filter, 56 is a switch circuit, 57 is a frequency divider ($\frac{1}{2}$), 58 is a 16 MHz clock oscillator, 59 and 60 are J-K flip-flops, 61 is a rotation data bit, 62 is a drive device selection data bit, 63 is a central processing unit, 64 is a memory and 65 is a common bus.

Correspondence between respective circuits of FIG. 1 and the circuits of FIG. 3 is considered here. The write data generating circuit 9 of FIG. 1 corresponds to a shift register 52 in FIG. 3, while the basic clock generating circuit 11 of FIG. 1 corresponds to the clock generator 58 and the J-K flip-flops 59, 60 in FIG. 3, the voltage controlled oscillator 12 in FIG. 1 to the oscillator 54, low-pass-filter 55, switch circuit 56 and $\frac{1}{2}$-frequency divider 57 in FIG. 3, and the switching control circuit 14 in FIG. 1 to the part for holding the rotation data bit 61 in the control register 40 in FIG. 3, respectively.

First, the central processing unit CPU 63 sets various control data to the control register 40. At this time, the rotation data bit 61 of "H" level indicates a low speed rotation (300 rpm mode) and the signal $\overline{\text{LWSPD}}$ of "L" level is sent to the drive device. The floppy disk controller 2 controls the J-K flip-flop circuits 59, 60 with a low speed rotation signal LSPD of "H" level and generates an internal clock of 4 MHz. This 4 MHz internal clock controls the shift operation of the shift register 52 and sends the write data to the drive device. In addition, the $\frac{1}{2}$-frequency divider 57 is set in the path of the phase-lock loop circuit by controlling the switch circuit 56 and simultaneously a character of the low-pass-filter 55 is set for the low speed rotation. Thereby the read/write operation in low speed rotation (300 rpm) can be realized.

On the other hand, when the rotation data bit 61 is the control register 40 is "L" level, it indicates the high speed rotation mode (360 rpm) and the signal $\overline{\text{LWSPD}}$ of "H" level is sent to the drive device. The floppy disk controller 2 controls the J-K flip-flops 59 and 60 with the low speed rotation signal LWSPD of "L" level and generates an internal clock of 8 MHz. This internal clock signal of the 8 MHz controls the shift operation of shift register 52 and the write data is sent to the drive device. Moreover, the $\frac{1}{2}$-frequency divider 57 is removed from the path of the phase lock loop circuit by controlling the switch circuit 56 and the characteristic of the low-pass-filter is set for the high speed rotation. As described above, the read/write operation in high speed rotation (360 rpm) can be realized.

The drive device selection data sent from the central processing unit 63 is set as the drive device selection bit 62 to the control register 40. In the embodiment, the drive device selection data bit 62 is composed of 2 bits and the drive device is allowed to be connected to a maximum of 4 units. This 2-bit signal is decoded by the decoder 45 and makes "L" level any one of the signals of $\overline{\text{DS0}} \sim \overline{\text{DS3}}$. A one drive device is thus selected as described above. The drive device selection signals $\overline{\text{DS0}} \sim \overline{\text{DS3}}$ are individually sent to the respective drive devices. Meanwhile, the speed of rotation switching signal ($\overline{\text{LWSPD}}$) line 15, write data line 16 and read data line 17 are connected in common on the wired-OR basis between the floppy disk controller 2 and a plurality of drive devices 1.

In the remaining part of the floppy disk controller 2, the operation command register 41 receives the read command and write command from the central processing unit 63, the status register 42 sends various status data in the floppy disk controller 2 to the central processing unit 63, the write data register 43 holds data transferred from the memory 64 under the direct memory access control, the read data register 44 holds the data to be transferred to the memory 64 under the direct memory access control, the shift register 52 converts the input parallel bit data into serial bit data and then outputs it, the shift register 53 converts the input serial bit data to parallel bit data and then outputs it, and the control circuit 51 performs various control operations based on the commands sent from the central processing unit 63.

Figure 4:
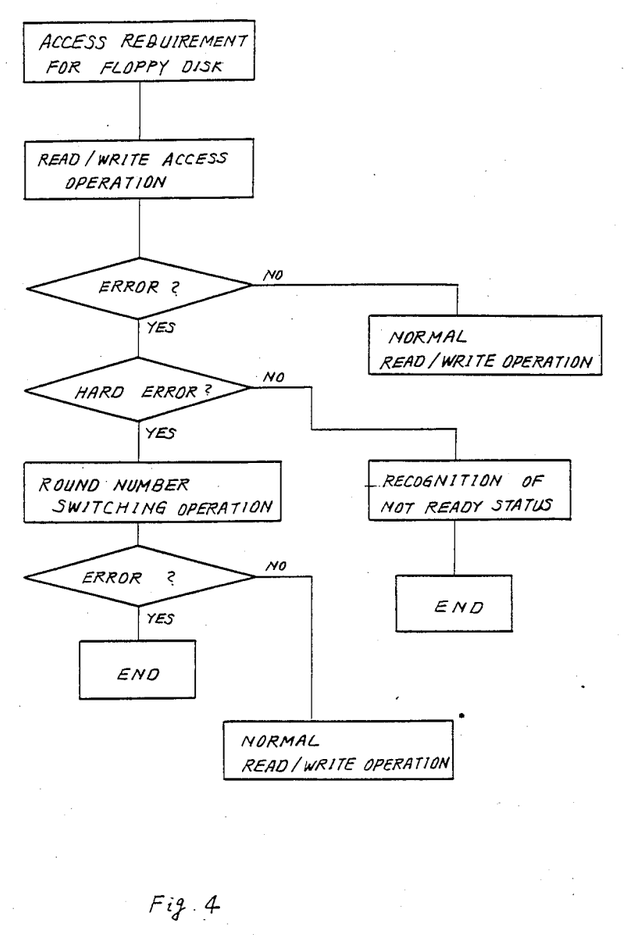
FIG. 4 is a flowchart indicating an example of access operation from a data processor to a floppy disk unit.

Next, an example of the access operation of the floppy disk unit from the central processing unit 63 is described with reference to FIG. 4.

First, when an access request to the floppy disk unit is generated in the central processing unit 63, it sends the read or write command to the floppy disk unit in order to execute the read or write operation. At this time, if an error is not generated, ordinary read or write operation is executed completely. Meanwhile, if an error is generated, the central processing unit 63 reads the status data in the floppy disk unit and checks whether the pertinent is a hardware error or software error. When it is not a hardware error, the floppy disk unit is recognized to be in the NOT READY state, and thereby access to the floppy disk unit is terminated. When it is a hardware error, it is recognized that the intrinsic speed of rotation of the floppy disk unit used does not match the rotation data preset to the control register 40 and a different rotation data is set to the control register 40. The central processing unit 63 again sends the read or write command to the floppy disk unit in order to execute the read or write operation. At this time, if such a hardware error resulted from mismatching the speed of rotation in the first trial, the retrial at the different speed of rotation is then carried out successfully and an ordinary read or write operation is executed to completion. If an error occurs again for any reason, access to the floppy disk unit is terminated.

The above embodiment employs a structure where a plurality of drive devices are connected serially to the one floppy disk controller and each drive device can be operated at a different speed of rotation. Therefore, the above embodiment provides a mechanism for holding the rotation switching signal within the drive device at the timing of the rising edge of the drive selection signal.

It is obvious that this invention can also be adapted to a floppy disk unit having only one drive device.

Moreover, in the case that a plurality of drive devices are connected, it is possible to normally operate the desired drive device in accordance with the characteristic of the disk to be inserted.

In the above embodiment, the rotation switching signal is supplied to the drive device from an external device through the floppy disk controller, but in the case that a means for physically identifying a disk is provided with the disk itself, an identification signal may be sent to the controller from the drive device.

According to the present invention, an access to read/write from/to disks having different characteristics with a single kind of drive device and a single kind of controller can be realized and therefore compatibility of data between disks can be realized easily.

While the present invention has been described with respect to a specific embodiment thereof, it is to be understood that the present invention is not limited thereto in any way but covers any and all changes and modifications which will become possible within the scope of the appended claims.

We claim:

1. A floppy disk unit comprising:
a motor drive mechanism,
a data read/write circuit,
a control means for changing the speed of rotation of the motor drive mechanism and the electrical characteristics of the data read/write circuit in accordance with the characteristic of the disk used, drive device and a floppy disk control means comprising respective parts of said data read/write circuit and said control means, wherein said drive device includes a write amplifier circuit which writes data from said disk, a read amplifier circuit which reads data from said disk, a motor controller which controls the speed of rotation of the motor and a first switching control circuit which controls respective characteristics of said write amplifier circuit, read amplifier circuit and motor controller, and said floppy disk control means includes a basic clock generating circuit for providing a basic clock signal, a write data generating circuit which generates the data to be sent to said write amplifier circuit according to said basic clock signal, a phase comparator which receives at a first input terminal the data read by said read amplifier circuit, a voltage controlled oscillator which receives an output of said phase comparator and provides a first output of a second input terminal of said phase comparator and a second output as the read data, and a switching control circuit which controls the period of the clock generated by said basic clock signal generating circuit and a characteristic of said voltage controlled oscillator.

2. The unit of claim 1 wherein said second switching control circuit in said floppy disk control means comprises a control register means for holding rotation data of said disk.

3. The unit of claim 2 wherein said first switching control circuit comprises a flip-flop which is set in accordance with said rotation data stored in said control register means.

4. The unit of claim 2 or 3 comprising an external data processing unit for setting said rotation data into said control register means.

5. The unit of any one of claims 1 to 3 wherein a plurality of said disk drive devices are connected to said floppy disk control means.

6. The unit of claim 4 wherein disk drive selection data is set, together with said rotation data, into said control register means by said external data processing unit.

7. The unit of claim 6 wherein the flip-flop means of said first switching control circuit in said disk drive means is set on the basis of said rotation data and said disk drive selection data which selectively designates pertinent disk drive means.

8. The units of claim 6 wherein a plurality of said disk drive devices are connected to said floppy disk control means, said rotation data is sent in common to said plurality of disk drive devices from said floppy disk control means, and said disk drive selection data are individually sent to respective ones of said plurality of disk drive devices from said floppy disk control means.

9. The unit of claim 4 wherein said external data processing unit changes said rotation data in said control register means, when a hardware error occurs as a result of access to said floppy disk unit, and subsequently again accesses said floppy disk unit.

10. A control system for a floppy disk unit to be used with a plurality of floppy disks of different recording characteristics, comprising
a motor drive means for selectively driving each of said plurality of floppy disks,
information read/write means for selectively reading/writing data on each said floppy disk,
a basic clock generating circuit for providing a clock signal, a write data generating circuit for generating said data to be written selectively on each said floppy disk according to said clock signal, a phase-locked loop circuit for selectively comparing the rate of reading data from each said floppy disk, and control means for selectively changing respective parameters for operating each said floppy disk, including the speed of driving of each said floppy disk by said motor drive means, electrical characteristics of said information read/write means and of said phase-locked loop circuit, the period of said clock signal, and a write period of the write data generation by said write data generating circuit, in accordance with the respective characteristics of each said floppy disk, wherein, when one of said floppy disk is selected, the operation of said control means is such as to perform read/write access operation for said selected floppy disk with a predetermined first selection for said parameters, determine whether said read/write access operation for said first selection is operable, and if said read/write access operation for said first selection is not operable, to change said first selection to a predetermined at least one further selection for said parameters, and for subsequently determining whether each said further read/write access operation is operable, until the respective parameters for operating said selected floppy disk are provided.

* * * * *

UNITED STATES PATENT AND TRADEMARK OFFICE
CERTIFICATE OF CORRECTION

PATENT NO. : 4,644,419                    Page 1 of 2

DATED     : February 17, 1987

INVENTOR(S) : Hiroshi IINUMA et al.

It is certified that error appears in the above-identified patent and that said Letters Patent is hereby corrected as shown below:

In Fig. 1 the block "DRIVE DEVICE" should be numbered --1--; the block labelled "FLOPPY DISK CONTROLLER" should be numbered --2--; in the block 5, "MOTOR COLTROLER" should be --MOTOR CONTROLLER--; in the label on the signal line interconnecting blocks 13 and 14, "SWITCMING" should be --SWITCHING--; the output line from block 14 should be labelled --LWSPT-- and that same line, extending outside the perimeter of block 2, should be designated --15--; and the line labelled "DRIVE DEVICE SELECTION SIGNAL", at the portion extending to the right of the perimeter of block 2, should be designated --18--;

In Fig. 2, in the descriptive label for block 7, "AMPLIFITER" should be --AMPLIFIER--; and In Fig. 3, in the descriptive label for block 51, "CIFCUIT" should be --CIRCUIT--.

Column 1, line 15, delete "respectively", and after "rmp," (second occurrence) insert --respectively,--;
line 36, delete "into".

Column 2, line 12, delete "and";
line 14, "line," should be --line, and--;
line 63, after "floppy" insert --disk--.

Column 3, line 19, "33" should be --2$\supset$--;
line 35, "abovementioned" should be --above-mentioned--.

Column 4, line 66, "of" (second occurrence) should be --to--.

Column 5, line 9, delete "error", and after "pertinent" insert --error--.

UNITED STATES PATENT AND TRADEMARK OFFICE
CERTIFICATE OF CORRECTION

PATENT NO. : 4,644,419
DATED : February 17, 1987
INVENTOR(S) : Hiroshi IInuma et al It is certified that error appears in the above-identified patent and that said Letters Patent is hereby corrected as shown below:

Column 6, line 62, "comprising" should be --comprising:--.

Signed and Sealed this

Third Day of May, 1988

Attest:

DONALD J. QUIGG

Attesting Officer

Commissioner of Patents and Trademarks